March 22, 1966  J. MAHLER  3,241,960
METHOD FOR MAKING VECTOGRAPHS
Filed Oct. 24, 1961  3 Sheets-Sheet 1
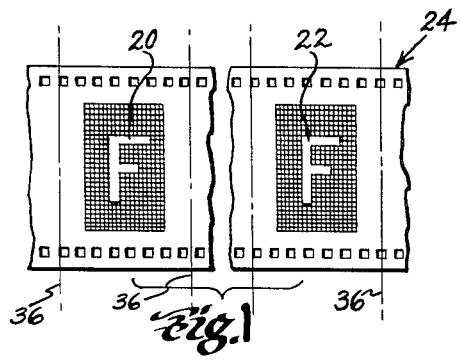
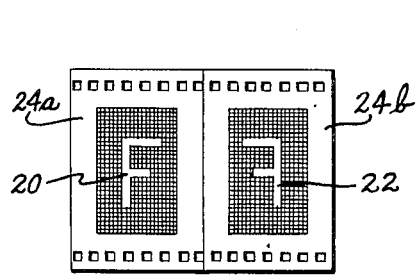
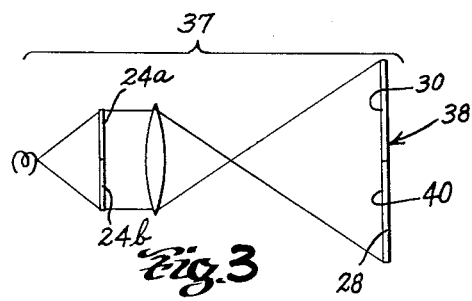
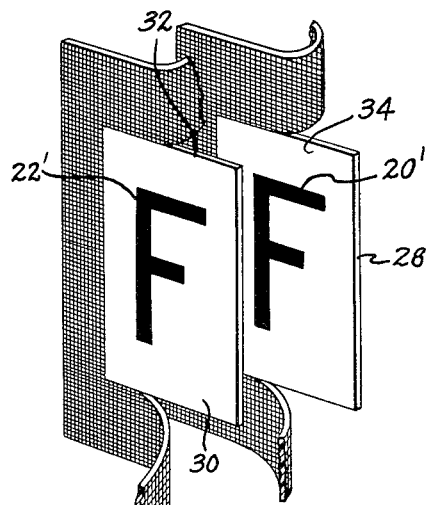
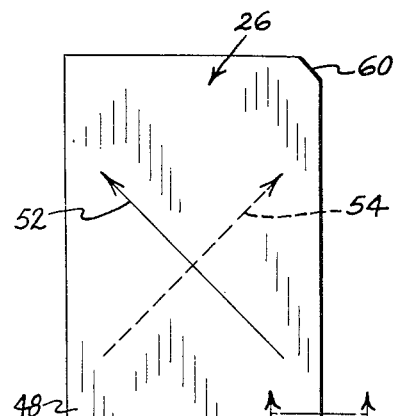
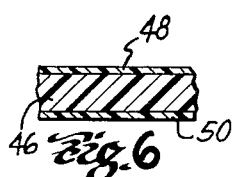
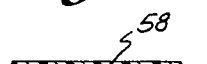
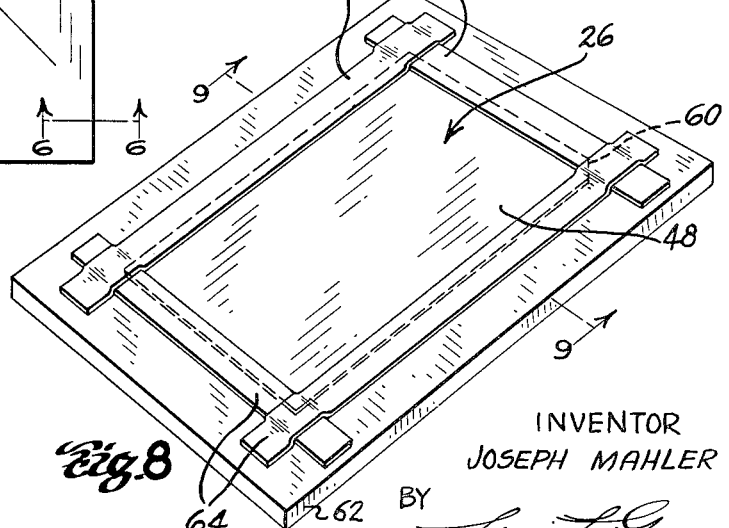
INVENTOR
JOSEPH MAHLER
BY
*Louis L. Gagnon*
ATTORNEY March 22, 1966   J. MAHLER   3,241,960
METHOD FOR MAKING VECTOGRAPHS
Filed Oct. 24, 1961   3 Sheets-Sheet 2
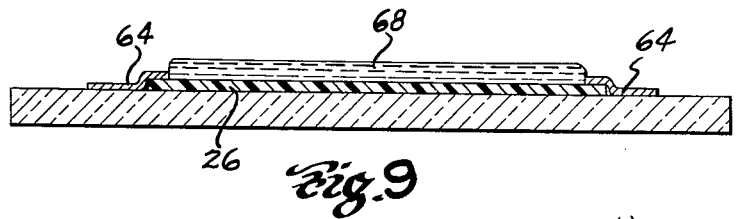
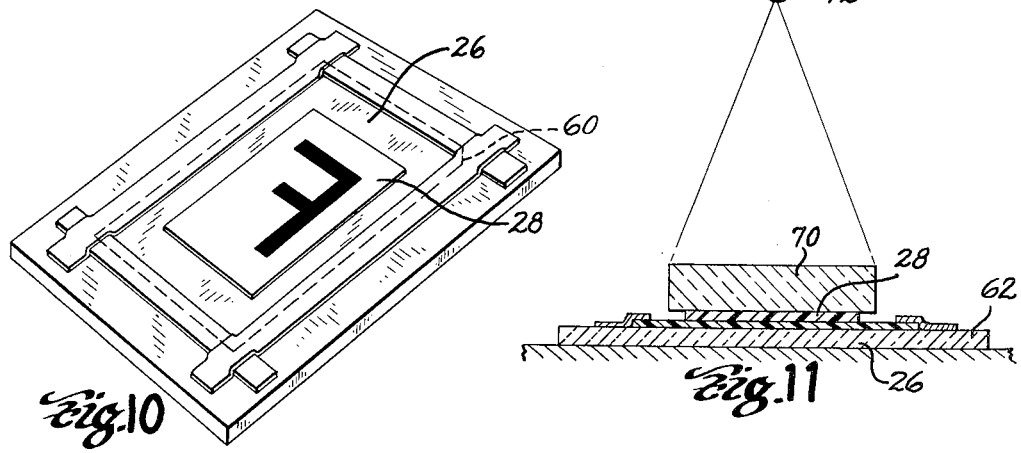
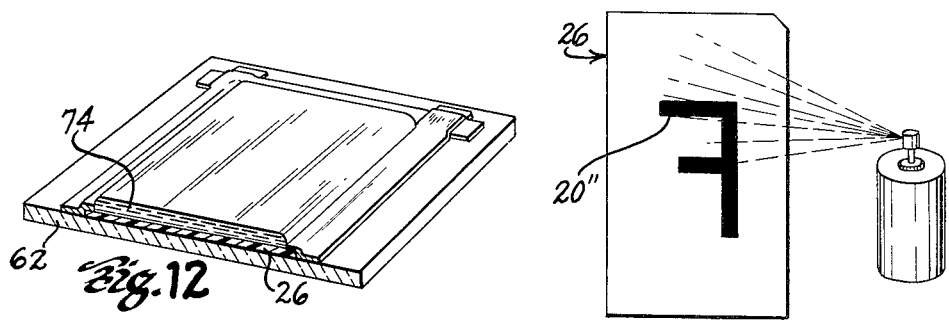
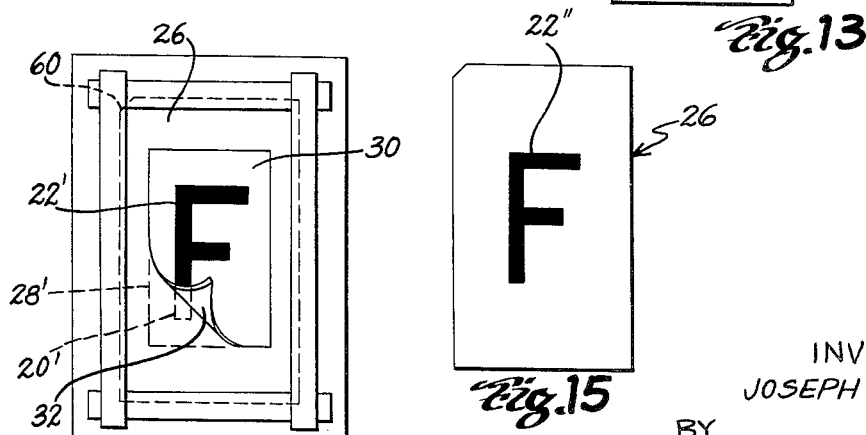
INVENTOR
JOSEPH MAHLER
BY Louis L. Gagnon
ATTORNEY

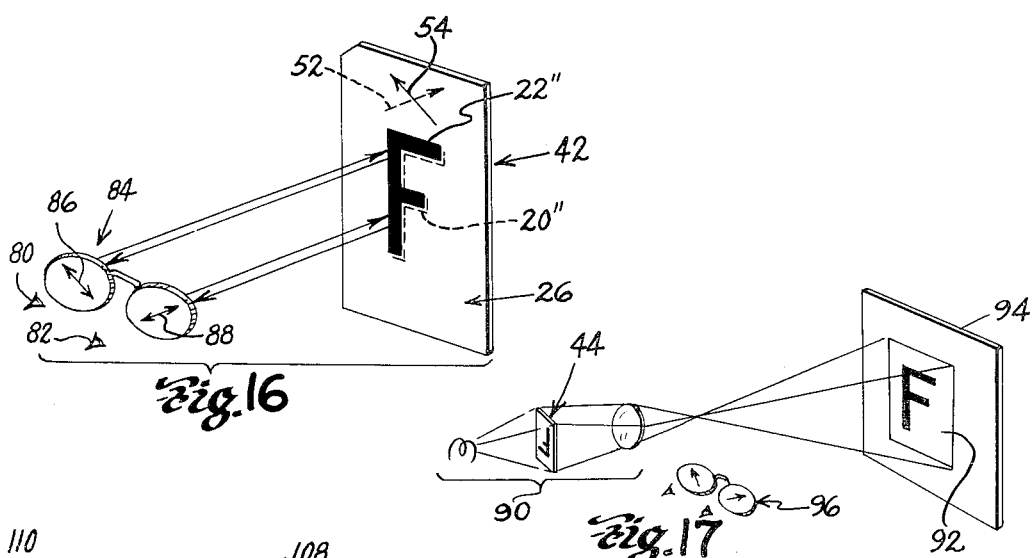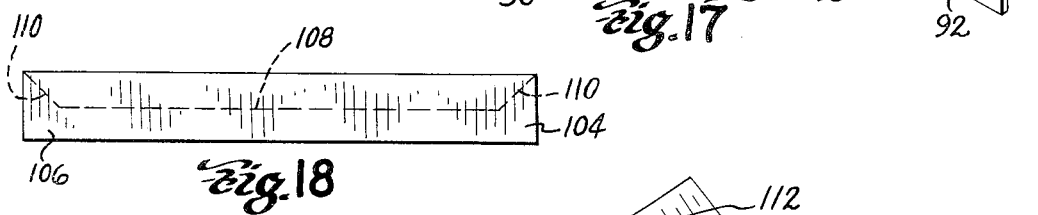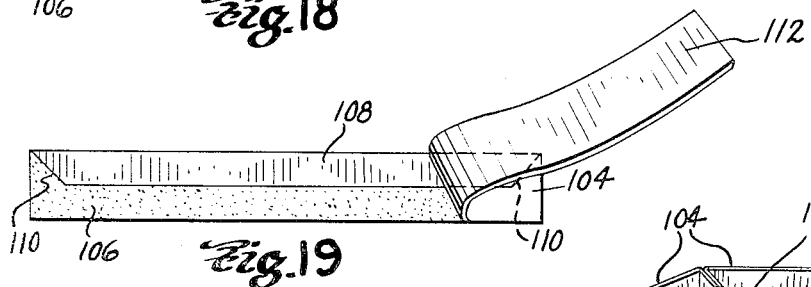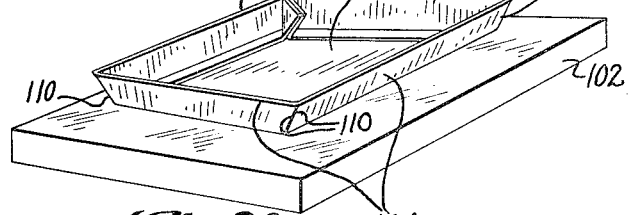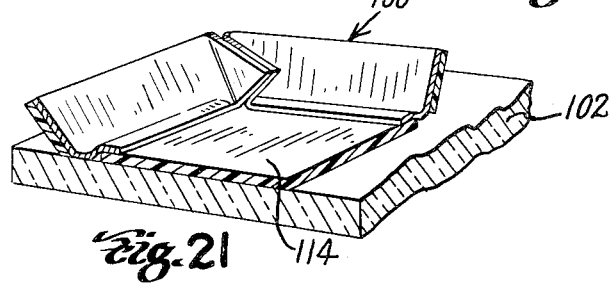
INVENTOR
JOSEPH MAHLER
BY
Louis L. Gagnon
ATTORNEY

United States Patent Office 3,241,960
Patented Mar. 22, 1966

3,241,960
METHOD FOR MAKING VECTOGRAPHS
Joseph Mahler, Fiskdale, Mass., assignor to American Optical Company, Southbridge, Mass., a voluntary association of Massachusetts
Filed Oct. 24, 1961, Ser. No. 147,220
2 Claims. (Cl. 96—27)

This invention relates to vectographs and method of making the same and has particular reference to a unique process for making positive vectographs directly from positive masters.

In general, the invention relates to an improved process for making positive copies or prints of positive transparent pictures or drawings or the like which prints are light-polarizing in that they are formed of a birefringent, highly molecularly oriented film material whose picture information is in the nature of a dichroic stain deposited in and electrochemically bonded to said film material. The prints, in bearing the above characteristics, are known and referred to as vectographs and, as it will become apparent hereinafter, the present invention relates to the making of vectographs embodying single picture elements and/or stereoscopic vectographs which comprise a pair of physically overlaid and accurately registered stereoscopic vectograph pictures with their respective axes of polarization at 90° to each other and which can be optically separated so as to be selectively visible to each eye by the use of analyzers. A pair of light-polarizing analyzers with their respective axes of polarization at 90° to each other and placed one before each eye, permit the eyes to see only the correct stereo picture in the usual manner of producing three-dimensional viewing.

Accordingly, a principal object of the present invention is to provide unique vectographic reflection prints and/or projection transparencies and an unusually simple, inexpensive and reliable process for making the same directly from positive transparencies.

Another object is to provide a positive-to-positive printing process of the above character wherein black and white positive vectographs are formed directly from black and white or colored positive transparencies without the need for darkroom facilities and with an unusual minimum of expenditure for equipment and materials.

Another object is to provide a printing process of the above character by means of which black and white positive vectographs of superior quality may be made directly from positive masters with an assurance of accurate duplication and with the elimination of the customary time-consuming and expensive positive-to-negative-to-positive reversal steps and darkroom procedures which are essential to conventional printing techniques of this nature.

Another object is to provide a printing process which lends itself readily to amateur participation in the vectographic art by reason of its economy, simplicity and assurance of success.

Another object is to provide novel film sensitizing, developing and fixing formulations for vectographic printing which are inexpensive, easy to prepare and consist of readily available commercial materials and whose proportions of ingredients in the respective formulations are permitted considerable variance from known preferred proportions in each case without detriment to the end product of the process.

Another object is to provide a novel vectograph printing process, technique and means for carrying out the same which is non-critical in all aspects thereof relating to the preparation of chemical formulations, exposure times and/or environment in which the procedure of the invention is practiced.

Another object is to provide novel means and method for applying processing solutions to films being printed in accordance with the invention.

Another object is to provide a process of the above character which is especially adaptable and ideally suited for the production of stereoscopic vectographs.

Another object is to provide a process of the above character in which stereo registration of a pair of superimposed stereoscopic images can be accomplished simply and with complete assurance of accuracy.

Another object is to simply the preparation of hand-reflection or projection type stereoscopic or other vectographs by the practice of the invention and to minimize the expenditure and time required in the production of such vectographs.

Other objects and advantages of the invention will become apparent from the following description when taken in conjunction with the accompanying drawings, in which:

FIG. 1 is a plan view of an exposed and developed conventional camera film having a pair of stereoscopic picture images thereon and from which master prints are made in accordance with a preferred aspect of the invention;

FIGS. 2 and 3 diagrammatically illustrate a preferred technique for forming said master prints;

FIG. 4 is a perspective view of the pair of master prints wherein they are illustrated as being partially trimmed in accordance with a preferred technique for rendering the picture information on the respective masters readily and accurately registerable for three-dimensional viewing in carrying out subsequent steps in the process of the invention;

FIG. 5 is a plan view of a vectograph film which is to be printed in accordance with the invention;

FIG. 6 is a greatly enlarged fragmentary cross-sectional view of said vectograph film taken on line 6—6 in FIG. 5;

FIG. 7 is a view similar to FIG. 6 which illustrates an alternate form of vectograph film;

FIGS. 8–12 are diagrammatic illustrations respectively of various successive steps which are performed in printing one side of a vectograph film in accordance with the invention;

FIG. 13 is a plan view of the printed side of said film and further illustrates a preferred manner of treating said side by the application of a light-reflecting medium thereto for purposes of producing a hand-held reflection print;

FIG. 14, when taken with FIGS. 8–12, illustrates the process of printing the opposite side of said vertical film;

FIG. 15 is a plan view of the resultant printed opposite side of said film;

FIG. 16 illustrates the resultant hand-held reflection print and a manner of viewing the same for receiving the three-dimensional effect of the superimposed stereoscopic images thereon;

FIG. 17 illustrates a manner of utilizing a vectograph print similar to that of FIG. 15 for projection purposes when the step of applying the reflecting medium thereto is eliminated;

FIGS. 18 and 19 are front and rear views respectively of pieces which are used to form a processing tray for use in processing films in accordance with the invention;

FIG. 20 is a perspective illustration of the processing tray in a position ready for use; and FIG. 21 is an enlarged fragmentary perspective view of a corner portion of the tray.

Referring more particularly to the drawings wherein like characters of reference designate like parts throughout the vaious views, it will be seen that, for purposes of illustration, a process is shown in the drawings and will be described in detail hereinafter for producing a stereoscopic vectograph which is printed from a pair of stereoscopic right and left eye picture images 20 and 22 on a conventional camera film 24 (FIG. 1) which has been exposed and developed in the usual manner. It is pointed out, however, that the present invention basically relates to the printing of a picture image upon a birefringent film 26 such as shown in FIG. 5 to form a vectograph which may or may not be of the stereoscopic type. That it, a single picture image printed upon one side only of a birefringent film having its axis of polarization oriented in one direction only may be produced in accordance with the process to be disclosed herein or, picture images may be printed on both sides of a birefringent film in overlying relation with each other wherein their respective axes of polarization are at 90° to each other.

The description to follow will outline this latter aspect of the invention and it will become apparent that the former case of printing a single picture image vectograph actually embodies the same procedure used to print either the first or second picture image of a pair of stereoscopic images.

The film 24 is a conventional camera film upon which there has been exposed and developed the two stereoscopic picture images 20 and 22. For ease of illustration, the images 20 and 22 are shown as being the letter F and the film 24 is conventionally a negative wherein the picture images F, which are to be in dark outline with a light background on the finished vectograph, are reversed or as it can be seen in FIG. 1, they are conventionally negative (light with a dark background).

A positive master (see FIG. 4) of each of each negative picture image 20 and 22 is made in a manner to be described shortly and it is from these positive masters 28 and 30 respectively that the ultimate positive vectograph is directly printed.

It is pointed out that while the line images F have been chosen for ease of illustration, the more common photographs such as portraits or scenic pictures or the like having highlights and varying tones or densities may be used and reproduced as vectographs in precisely the manner to be described with relation to the illustrated line images F.

Since a stereoscopic vectograph is to be produced from the two masters 28 and 30 of the two stereoscopic master images 20′ and 22′ which will be referred to hereinafter as left eye and right eye images respectively, the prints of these masters must be produced one on each side of the vectograph film 26.

As, in the case of all conventional contact print operations, it is well known that the emulsion side of any film should be placed directly against the copy material which is to receive the print thereof. Otherwise, if two films are printed under identical conditions, one with the emulsion side against the copy material and the other oppositely disposed, the resultant resolution of the copies would be different. The picture image which was formed from the film having its emulsion side away from the copy material would, naturally, be inferior to the other. Therefore, the masters 28 and 30 should have emulsion sides 32 and 34 respectively facing each other as shown in FIG. 4 when the image characters 20′ and 22′ thereof are correctly oriented or readable with the masters placed in overlying relation with each other and viewed one through the other.

In order to produce masters 28 and 30 having their respective emulsion sides 32 and 34 arranged as shown in FIG. 4, the film 24 is cut along the lines 36 to separate the right and left eye images 20 and 22. One of the resultant pieces 24a or 24b of the film 24 is turned over and abutted against the other piece thereof as shown in FIG. 2. In order to be consistent with relation to left and right eye images throughout the description to follow and throughout the illustrations of the steps in the process, the right eye image (FIG. 2) will be designated as the one to be turned over as shown.

The masters are then formed preferably to enlarged sizes by a conventional photographic enlarging process which is diagrammatically illustrated in FIG. 3. That is, the two film pieces 24a and 24b are supported in side-by-side relation in an enlarger 37 wherein their respective image characters are projected upon the master film material 38 which is then processed conventionally to form the transparent masters. It can be seen that by reversing the film piece 24b which has the right eye image 22 as shown in FIG. 2, its enlarged reproduction 22′ on the master 30 will have its emulsion side 32 (FIG. 4), on its rearward face and the enlarged reproduction 20′ of the left eye image 20 will, on the master 28 have its emulsion side on its forward face and directed toward the master 30 when the two masters are placed to overlie each other with their images 20′ and 22′ accurately stereo superimposed.

By this technique of producing the masters 28 and 30, it can be seen that in the contact printing operation to follow wherein one master is placed against each side of the vectograph film 26 at different times in the process, the masters will, in each case, have their emulsion sides directly against the vectograph film and will print with substantially identical degrees of resolution and contrast.

It is pointed out that the masters 28 and 30 may be formed from conventional black and white or colored projection slides or the like rather than the negative film 24 in FIG. 1 if desired. Such projection slides (which, in themselves, are positive picture images) must then be enlarged as shown in FIG. 3 to form black and white masters which are also positives. This can be done by using as the copy film 38, a so-called "direct positive" type of film material which is well known in the photographic art and commercially available. Alternatively, a standard positive-to-negative-to-positive reversal process can be used to form a positive master such as 28 or 30 from a positive projection type transparency or the like.

It should also be understood that a conventional contact printing operation may be used to produce transparent masters like 28 or 30 from negative films if desired. However, this technique is not preferred when making masters for use in subsequently producing stereoscopic vectographs for the reasons given above with relation to the drawbacks inherent in contact printing with the emulsion side of a film not in contact with the print or copy material. Furthermore, it is entirely possible to use any positive transparency directly without making enlargements thereof in place of the masters 28 and 30 described hereinabove for carrying out the process of making vectographs in accordance with this invention. The invention will, however, be described in its preferred form wherein the masters 28 and 30 are used to form either the vectograph print 42 shown in FIG. 16 or the print 44 shown in FIG. 17.

The masters 28 and 30 whose images 20′ and 22′ respectively must be accurately stereo registered when printed upon the vectograph film 26 are placed together and adjusted laterally until their respective images 20′ and 22′ are accurately stereoscopically registered with each other and then cut or trimmed simultaneously while being held tightly together to remove excess film material from around their respective image areas. This is shown in FIG. 4 wherein the masters 28 and 30 are only partially trimmed and shown separated from each other only for purposes of illustration. Once the masters 28 and 30 are trimmed to identical rectangular or any other desired configuration, they can be separated and re-registered with each other at any time simply by aligning their respective edge portions.

The birefringent film 26 which is to be printed in accordance wtih the invention is conventional in that it embodies an intermediate supporting base or substrate 46 (see FIG. 6) of cellulose acetate butyrate or the like having a highly oriented birefringent film or layer of polyvinyl alcohol laminated to each side thereof as indicated by the reference numerals 48 and 50. The polyvinyl alcohol layers 48 and 50 are rendered birefringent prior to lamination with the substrate 46 by having been stretched to orient the molecular structure thereof vectorially; that is, to elongate their molecular structure in the direction of stretch which direction is known in the art as the axis of absorption. This establishes the axis of polarization of the respectively stretched polyvinyl alcohol layers perpendicular to their axes of stretch or so-called axes of absorption. The axes of polarization 52 and 54 of the respective polyvinyl alcohol layers 48 and 50 are arranged so as to be oriented in directions normal to each other preferably in the manner shown in FIG. 5 when they are laminated to the substrate 46. The resultant vectographic film 26 having the birefringent polyvinyl alcohol strips on both sides thereof as shown in FIGS. 5 and 6 is then adapted to receive stereoscopic picture images, one on each side thereof. If, however, it is desired to produce a single picture image vectograph wherein only one side of a film such as 26 is to be printed, the reverse side thereof need not be provided with birefringent material. Such a film is shown in FIG. 7 wherein the substrate 56 is provided with a birefringent layer 58 on one side only. This layer 58 may be on the opposite side of the substrate 56 if desired.

Referring again to the film 26 in FIGS. 5 and 6, it will be noted that its upper right-hand corner is cut away at 60. This provides immediately detectable means for identifying the direction of the particular axis of polarization of the particular side of the film facing a person. Other means of identification may, of course, be used but, by establishing the condition where the axis of polarization is parallel to the cut made to remove the corner of the film at 60 when said cut-away corner is at the upper right as the film faces a person, it is known that the axis of polarization of the opposite side of the film is normal to the direction of the cut at the corner 60.

In accordance with a preferred printing procedure of the invention, the left eye image 20' of the master 28 is printed on the side of the film 26 having the oriented polyvinyl alcohol layer 48, and the right eye image 22' of the master 30 is printed on the side of the film 26 having the oriented polyvinyl alcohol layer 50.

The printing procedure is as follows:

The film 26 placed upon a supporting plate 62 which may be formed of glass, metal, wood or plastic and clamped or taped securely thereto about its edges preferably with conventional pressure sensitive masking tape or the like 64. The printing of the left eye image 20' from the master 28 upon the side of the film having the oriented polyvinyl alcohol layer 48 will first be described and, therefore, the film 26 is placed upon the plate 62 with its polyvinyl alcohol layer 48 exposed and the cut-away upper corner 60 of the film 26 placed to the upper right. The cut-away corner 60 can be detected through the tape 64.

It is pointed out that the cut-away corner 60 of the film must be honored at all times during the process of the invention when forming a stereoscopic vectograph in order to receive a true stereoscopic picture. Any reversal of the particular positions of the film corner 60 given herein will yield a pseudoscopic picture.

With the film arranged as shown in FIG. 8 and under normal conditions of environmental humidity, it is ready to be treated with a sensitizing solution and printed in a manner to be described in detail shortly. If, however, the printing is to be done under conditions of excess humidity, for example, in an environment where the humidity is within the vicinity of 80% or greater, it is preferable to first treat the film 26 with a conditioning solution consisting of from 5 to 10 grams of sodium sulphate or any similar water soluble salt such as sodium phosphate in approximately 100 cc. of water. The solution is applied to the exposed side of the film 26 and allowed to remain thereon for from 1 to 3 minutes and the film 26 is then wiped dry and clean. A solution consisting of 10 grams sodium sulphate in 100 cc. water applied for 1 minute is preferred. Since the polyvinyl alcohol layers 48 and 50 are characteristically moisture sensitive, they will, under excessively humid atmospheric conditions become abnormally absorptive to aqeuous solutions such as are used to sensitize the films in the steps to follow and thereby permit an excessive penetration of said aqeuous solutions which, as it will become apparent hereinafter, might produce undesirably dense prints under the preferred conditions of the printing process to follow. This could be compensated for in the subsequent preparation and application of the sensitizing solution as it will also become apparent hereinafter so as to obviate the need for the above described conditioning solution but not without complicating the process. Therefore, it is preferred to use the conditioning solution when working in excessively humid atmospheres. Otherwise, the above-mentioned film conditioning step may be obviated and under normal conditions of atmospheric humidity it is not necessary and preferably not used.

The purpose of applying the conditioning solution to the polyvinyl alcohol film layer 48 is to cause said layer to absorb enough of the salts therein to prevent excessive absorption and penetration of the film sensitizing solution to be next applied to the film 26. The salts thus act in the manner of a filler within the polyvinyl alcohol layer 48.

It is pointed out that while various procedures might be used to apply aqeuous solutions to the film 26 as in the case of the above conditioning solution and other solutions to follow in the printing process, it is preferred to simply pour small amounts of these solutions directly onto the film 26 and spread them evenly over the exposed surface of the film as shown in FIG. 9. The tape 64 functions a dam which holds the solution in place without runoff and being hydrophobic, it allows a slight build-up of the solutions as shown in FIG. 9 above the tape 64 due to their surface tensions. The reference numeral 68 indicates an aqueous solution and since all solutions described herein are of such nature, FIG. 9 is given to illustrate the manner of applictaion of all solutions described herein and the reference numeral 68 may be taken to indicate either the conditioning solution which has been described above or the sensitizing, developing or fixing solutions to be described hereinafter.

After treatment of the film 26 with the conditioning solution or in the more usual instances where such conditioning is not required, a sensitizing solution is applied to the exposed surface of the film 26 in the manner illustrated in FIG. 9.

The sensitizing solution which is a copper chromate solution consists of precontrolled proportions of water, ammonium dichromate and a copper compound in which copper is bivalent such as anhydrous cupric chloride or cupric sulphate. While it is preferred that the copper compound be anhydrous by reason of the fact that it is destitute of the water of crystallization, these chemicals in crystalline form may be used within the range of proportions of ingredients to be set forth hereinafter.

Ammonium dichromate is a known light-sensitive agent and its function in producing light sensitive films is well known and understood in the photographic art. The cupric chloride or cupric sulphate functions as an activating or releasing agent to free iodine from an iodide developing solution to be later applied to the film 26 and described hereinafter.

The sensitizing solution is prepared in accordance with the densities desired of the resultant vectograph prints which are to be formed and, at this point in the description, it should be understood that in the making of strictly line type vectographs such as those shown in the drawings wherein the lines (the letters F in this case) should be as dark as possible with a transparent background, print densities are not critical provided they are dark enough to produce the desired contrast. However, in picture images of continuous tone or varying densities, the print densities are critical in accordance with the types of vectographs which are to be formed. For hand-held stereoscopic reflection prints 42 such as the one shown in FIG. 16 which have a light-reflecting backing and are viewed from the front wherein light enters the front of the print 42 and is reflected back through the print for viewing, half density prints of each of the front and back stereoscopic images are required since the total illumination as viewed in this manner will present a picture of full density to the eyes. In transparent stereoscopic vectographs such as 44 in FIG. 17 full density prints of each stereoscopic image is required since, when these vectographs are used for projection purposes, light is directed completely therethrough only once and then onto a projection screen.

The following proportions of ingredients for the film sensitizing solution will be suitable for making individual prints of normal half densities. Thus, all proportions set forth hereinafter with the exception of the water would be doubled for full density prints, tripled for very dense transparencies or, in various proportionately variable amounts suitable for producing the density characteristics desired of the individual prints or picture elements. The term "half density" is meant to describe prints whose densities are approximately one-half that of a projection transparency which is considered in the photographic field to be ideally suited for projection purposes and which when projected provided viewing images having the best known definition and contrast.

A preferred sensitizing solution for half density prints would consist of the following:

*Example A*

100 cc. water
1 gram ammonium dichromate
1 gram cupric chloride or cupric sulphate.

*Example B*

100 cc. water
From 1 to 3 grams ammonium dichromate
From 1 to 3 grams cupric chloride or cupric sulphate.

*Example C*

100 cc. water
¼ gram ammonium dichromate
2 grams cupric chloride or cupric sulphate.

*Example D*

100 cc. water
½ gram ammonium dichromate
1 gram cupric chloride or cupric sulphate.

*Example E*

100 cc. water
1 gram ammonium dichromate
½ gram cupric chloride or cupric sulphate.

Other solutions having the same related proportions of ingredients between the ranges given in the above examples may be used and it can be seen from said examples that the amount of ammonium dichromate used is the factor determining the amount of cupric chloride or cupric sulphate needed and thus greater amounts of ammonium dichromate in the solution requires less amounts of cupric chloride or cupric sulphate.

After the sensitizing solution, preferably in the first given proportions of ingredients (Example A), is applied to the film 26 in the manner illustrated in FIG. 9, it is allowed to remain for approximately 2 minutes and the film is thereafter wiped clean and dry. While a minimum time period of 1 minute is generally necessary for properly sensitizing the film 26 in all cases, this time period is not critical and may be reduced to approximately ½ minute or increased to approximately 3 minutes without being detrimental to the end result of the process.

After being sensitized, the film 26 is allowed to dry thoroughly which usually takes about 7 minutes at normal room temperatures and in still air. The drying process may be speeded up by circulating air thereover if desired but preferably without the application of any heat appreciably greater than a normal room temperature. While in this condition the film is not critically sensitive to normal room lighting, it is preferable, but not essential, to protect it from direct light or excessively bright room light during its drying period. This can be accomplished simply by placing the sensitized film in a cabinet drawer or the like for the few minutes required for it to become completely dry. It is pointed out that with normal precautions against direct or excessive exposure of the film 26 to light other than that encountered under normal room lighting conditions, the entire procedure of this invention does not require any darkroom facilities.

Once the film 26 is dried after sensitizing, the master 28 embodying the left eye image 20' is placed with its emulsion side 34 in direct contact with the film 26 as shown in FIG. 10. The master may be held in the position shown in FIG. 10 with bits of transparent tape or the like if desired and as shown in FIG. 11 a relatively thick transparent glass holding plate 70 or the like is placed over the master 28 to hold it flat and immovably in place against the film 26.

The glass plate 70 is preferably relatively thick so as to absorb heat produced by a lamp 72 which is used to expose the film 26 as will be described shortly and thereby obviate the possibility of overheating the film 26 or master 28.

With the assembly of the supporting plate 62, film 26, master 28 and glass holding plates 70 made as shown in FIG. 11, light from a source 72 is directed through the plate 70 and master 28 to expose the film 26 in the usual manner of making contact print exposures. It is again pointed out, however, that this step of exposure and the handling of the film 26 before and after exposure can be carried out in normal room light without detriment to the end result.

The light source 72 preferably consists of a No. 1 photoflood lamp placed approximately 4 inches above the glass plate 70 for a 5″ x 5″ picture or smaller. For larger pictures the light source should be approximately from 15 to 20 inches above the glass plate with proportionately longer times of exposure. Photoflood lamps of the type designated as Number 1 are well known in the photographic field and provide a color temperature of approximately 3200 Kelvin. An exposure time of approximately from 3 to 6 minutes is appropriate in the present case according to the density of the master used.

It is pointed out that exposure to direct sunlight will produce similar results.

After the film 26 has been exposed to the light source 72, the plate 70 and master 28 are removed and a developing solution 74 (see FIG. 12) is applied to the exposed surface of the film 26. This operation of developing, like all others herein, may be performed under normal room lighting conditions.

A preferred developing solution consists of the following proportions of ingredients prepared preferably in the order given.

Two grams of granular boric acid dissolved in 100 cc. water to which 1 fine crystal of a reducing agent such as sodium thiosulfate or thiourea is added and dissolved (by the term "fine crystal" it is meant a crystal weighing approximately .001 gram) and to which 5 grams of either potassium iodide, sodium iodide or ammonium iodide and 1 gram of magnesium acetate or of other known metallic acetates is subsequently added and dissolved.

With the above developing solution, the preferred time of development is approximately 2 minutes. Slightly longer or shorter development periods such as from ½ to 3 minutes will also produce desirable results and the above-outlined proportions of ingredients in the developing solution may be varied by +½ gram to −1 gram with the exception of the sodium thiosulfate or thiourea; the water content being 100 cc. in all cases. It should be understood, however, that the above-mentioned 5 grams of the iodide is considered to be proper for the reason that, in the final fixing step of the process which is accomplished with a 5% boric acid solution the iodide in the film 26 reacts with the fixing agent to control the final black and white color or tone of the print. If, for example, an excess of the iodide were used, the final result would produce a more sepia tone to the print. While, if too little of the iodide were used so that during fixation the boric acid become predominant, a more blue-appearing print would result. Iodide may be added to the fixing solution to overcome a predominance of boric acid if desired. That is, it is the amount of iodide used in the developing solution which controls the color absorption band of the final picture or print. The above color comparisons resulting from the use of more or less iodide are assumed to be those which would be made with the finished prints being examined in daylight color temperatures.

Returning now to the function of the various chemical parts of the developing solution, it is pointed out that the iodide (potassium sodium or ammonium iodide) is the staining agent which supports and holds the iodine stain therein. Thus, the unexposed portions of the sensitized film 26 (the portions which were beneath the black or opaque areas of the image F on the master) will have full power to react with the developing solution so as to release the iodine therein and thus stain these particular areas of the film to produce a positive print of the master. The exposed portions of the film 26, however, will not react to release any appreciable amount of iodine from the developer and thus will not become stained. When using masters of continuous tone values, the release of iodine during developing will react according to the gradation of tone value. Ammonium dichromate, by means of which the film was sensitized as described above, acts as a hardening agent on polyvinyl alcohol when exposed to light and thereby minimizes the tendency for iodine to be release and absorbed into the film.

Wherever the iodine (a dichroic statin) from the iodide solution in the developer is absorbed into the oriented polyvinyl alcohol layer 48 of the film 26, it will form an electrochemical bond with the oriented molecular structure of the polyvinyl alcohol thereby producing the positive polarizing print as a reproduction of the master 28. The reducing agent in the developing solution prevents free iodine from forming in the developing solution itself so as to keep the solution clear at all times whereupon it will only release iodine when in contact with the unexposed areas of the film 26. The metallic acetate releases metallic ions into the polyvinyl alcohol layer of the film 26 to improve the sharpness and definition of the picture image.

After proper development, the developer 74 is removed and the film 26 is wiped clean and immediately the above-mentioned fixing solution is applied to the film 26 in a manner identical to that shown in FIGS. 9 and 12.

The fixing solution comprises a 5% boric acid solution for example, 5 grams of boric acid powder in 100 cc. water. The fixing solution should always be applied fresh and not reused while the above-mentioned other solutions may be reused if desired. The fixing time preferred is approximately 2 minutes, but may be of a considerably longer duration if desired.

The boric acid fixing solution functions to firmly cross-link the molecular structure of the polyvinyl alcohol layer 48 to stabilize the final print and further reacts chemically with the iodide absorbed into the polyvinyl alcohol so as to provide the finished print with the proper shade as described in detail hereinabove.

After fixing, the film 26 is wiped dry and clean and removed from the supporting plate 62. This concludes the process required for forming a single picture vectograph in accordance with the invention and the resultant print having the image 20" is shown in FIG. 13. This print of the image 20" is, obviously, intended to be viewed from the opposite side of the film 26.

In order to form the stereoscopic vectographs shown in FIGS. 16 or 17, the identical printing process set forth hereinabove is performed on the reverse side of the film 26 using the right eye master 30 shown in FIGS. 4 and 14.

In preparing to carry out the printing process for the second side of the film 26, the film is, once again, taped or otherwise attached to the supporting plate 62 with its now printed side down. That is, with the cut-away corner 60 thereof at the upper left as shown in FIG. 14. The master 30 is placed upon the film 26 with its image 22' in accurate stereo registry with the printed image 20" which can be seen through the film 26. Registry of the right eye master with the left eye printed picture 22" on the film is made by aligning the edges of the master 30 with the edges of the printed left eye image in cases where there is some color in the picture background so that the edges of the complete left eye picture are visible as shown by dotted outline 28' in FIG. 14. The trimming of the edges of the masters as discussed hereinabove with relation to FIG. 4 provides this simple means for stereo registry of left and right eye images during printing. However, if stereo registry of the image characters of the masters is not made possible by aligning their respective edges, one must take care to accurately align the right eye image character of the master 30 with the already-printed left eye image character.

Once the master 30 is properly positioned upon the film 26 with its emulsion side 32 against the film 26, the entire printing process described above with relation to the printing of the left eye image is carried out step-by-step to produce the right eye image 22" (see FIG. 15) on the front or the intended viewing side of the film 26.

If the film 26 is prepared with half density picture images 20" and 22" as described above and is to be used as a hand-held reflection print such as shown by 42 in FIG. 16, its back side or, in this case, its side having the left eye printed image 20" is coated with a light-reflecting material such as an aluminum spray paint or the like. This is readily accomplished by using an aerosol type dispenser containing an aluminum spray paint. Such dispensers containing aluminum spray paint are, as it is well known, available commercially. This treatment of the back side of the film 26 may be effected after the printing of the left eye image and before the printing of the right eye image or, it may be done after the printing of the right eye image.

The hand-held reflection print then has the two superimposed stereoscopic images 20" and 22" (see FIG. 16) with their respective axes of polarization 52 and 54 respectively at 90° to each other which are separated optically and rendered selectively visible to each of the left and right eyes 80 and 82 of a viewer by suitable light-polarizing anlyzers 84 arranged before the eyes with their axes of polarization 86 and 88 normal to the respective axes of polarization 52 and 54 of the images. This, in the usual manner of three dimensional viewing, allows each eye to see only the correct stereo picture. That is, the left eye 80 will see only the image 20" and the right eye 82 will see only the image 22". The image forming light will pass into and through the film 26 of the print 42 from the front thereof and be reflected by the aluminum coating on the back side to again pass reversely through the film and be received by the eyes 80 and 82 for viewing.

If the finally printed film 26 in FIG. 15 is to be used as a projection transparency 44 as shown in FIG. 17, it would not be provided with the aluminum backing. The projection transparency 44 would be placed in a conventional projector as shown diagrammatically by the numeral 90 and its image 92 as projected on a screen 94 would be viewed with analyzers 96 in the same manner as described with relation to the use of the analyzers 84 in FIG. 16. A projection transparency 44 would, however, be prepared as a full denesity print for the reasons described in detail hereinabove.

It is pointed out that in place of the photoflood lamp 72 in FIG. 11 a conventional ultraviolet light source might be used. In such a case, the substrate 46 of the film 26 would be provided with a conventional ultraviolet absorber such as that known commercially as Uvinol or U.V. Absorber No. 9. In this way, the ultraviolet light would not penetrate through the substrate 46 of the film 26 and a film which has been sensitized on both sides might be exposed simultaneously on both sides each with a different master in place thereon by directing ultraviolet light onto the two masters from opposite sides of the film. With the intermediate ultra-violet absorbing substrate 46, light exposing one side of the film would not affect the other side thereof. By so exposing both sides of a film simultaneously, the film might then be developed and fixed by placing the same in trays containing the above-described developing and sensitizing solutions.

A modification of the invention embodies the provision of a unique disposable processing tray 100 (see FIG. 30) which would be used as a substitute for the strips of tape 64 described hereinabove. The tray construction shown in FIGS. 18–21 when used in place of the strips of tape 64 provides convenient means in which film processing solutions can be contained without danger of spill-over and simultaneously acts as means to hold a film which is to be processed securely in place upon a supporting plate 102 similar to the plate 62. The tray 100 is formed directly upon the film supporting plate 102 from a plurality of precut individual side pieces 104 which each embody a strip of pressure sensitive masking tape or the like 106 having a stiffening member 108 attached thereto as shown in FIGS. 18 and 19. The stiffening member 108 may be formed of cardboard or preferably of a .005 to .010 inch thickness of vinyl film material or the like and are arranged to extend across substantially the full length of the pieces of tape 106 covering preferably about half the width thereof. The opposite ends 110 of the stiffening members 108 are angled substantially as shown in FIGS. 18 and 19 so that when abutted with similar stiffening members of other side pieces 104 which are to make up the tray 100, they will produce the dish-like configuration of the tray wherein its sides slope upwardly and somewhat outwardly. The tray sides could, as it will become obvious hereinafter, be vertical if desired by simply providing square cut ends 110 upon the stiffening members 108.

The side pieces 104 are provided in different lengths in accordance with the particular lengths and widths of the film which is to be processed and are stocked in sizes of the desired lengths with a strip-off film material 112 covering the exposed adhesive areas of the tape 106. The strip-off film material 112 is removed when the assembly of the tray 100 is made. Also, in stocking the side pieces 104, they may, if desired, be stacked one upon another to obviate the need for the strip-off films 112.

In accordance with the invention, a film 114 (see FIG. 21) which is to be processed is placed upon the supporting plate 102 and taped thereto with the exposed adhesive sides of the pieces 104 substantially as shown in FIG. 21. The pieces 104 are then lifted to cause all of the respective ends 110 of the stiffening members thereof to substantially abut or engage each other so as to form the corners of the tray 100. Next, the exposed corner pieces of the tape 106 are pressed together as shown in FIGS. 20 and 21 to seal and secure the corners together with the result of forming the tray 100 as shown in FIG. 20. The area of the film 114 which is to be processed is thus exposed and forms the bottom of the tray configuration and the tape 106 forms the inner walls of the tray. Processing of the film is then accomplished by pouring the desired processing solution into the tray 100 so as to cover the film 114. Upon completion of the film processing the tray side pieces 104 are removed intact or separately and disposed of or the resultant frame of the assembled tray sides when kept intact may be reused by simply pressing it onto another film and supporting plate in its fully assembled condition.

It is pointed out that the tray 100 offers an advantage over the simple taping operation described with relation to FIGS. 8–14 in that its elevated sides permit the application of greater amounts of processing solutions without danger of runoff and the supporting plate and film using the tray construction can be easily moved or carried from one place to another while a solution is deposited thereon with less danger of spilling the solution.

From the foregoing, it can be seen that simple, efficient and economical means and method have been provided for accomplishing all of the objects and advantages of the invention. Nevertheless, many variations in the chemical compositions, changes in the details of construction and arrangement of parts or steps in the process may be made without departing from the spirit of the invention as expressed in the accompanying claims and the invention is not to be limited to the exact matters shown and described as only preferred matters have been given by way of illustration.

Having described my invention, I claim:

1. The process which comprises first applying to a side of a moisture sensitive birefringent molecularly oriented film an aqueous sensitizing solution containing a light sensitive dichromate hardening agent and a copper compound stain releasing agent and allowing said film to absorb an appreciable amount of said sensitizing solution, thereafter exposing different areas of said side of said film to differential amounts of light to render respective areas thereof receiving greater amounts of light more hardened and correspondingly less absorbent to an aqueous developing solution consisting essentially of an iodide staining agent having an iodine stain therein and a reducing agent preventing said stain from forming in said developing solution, next applying said developing solution to said exposed side of said film to cause absorption thereof into said exposed areas of said film, the absorption being proportionately greater in less hardened areas whereby reaction of said releasing agent in said film with said staining agent absorbed therein will release said iodine stain from said staining agent into said areas of said film surface in amounts corresponding to respective amounts of said developing solution absorbed into said areas and said released stain will bond with the molecular structure of said film, allowing said developing solution to remain on said side of said film only until desired maximum densities of said stain are produced in the least hardened areas thereof and finally removing remaining amounts of said developing solution.

2. The method of making a light polarizing true copy of an imagewise differentially light-transmitting master transparency comprising providing a copy medium having a moisture sensitive molecularly oriented birefringent side, first applying to said side an aqueous sensitizing solution containing a light sensitive dichromate hardening agent and a copper compound stain releasing agent and allowing said side of said copy medium to absorb an appreciable amount of said sensitizing solution, thereafter exposing said side of said copy medium to light directed through said transparency to produce a differential hardening of said side of said copy medium by rendering areas thereof receiving greater amounts of light more hardened and correspondingly less absorbent to an aqueous developing solution consisting essentially of an iodide staining agent having an iodine stain therein and a reducing agent preventing said stain from forming in said developing solution, next applying said developing solution to said exposed side of said copy medium to cause absorption thereof into said exposed areas thereof, said absorption being proportionately greater in less hardened areas whereby reaction of said releasing agent in said copy medium with said staining agent absorbed therein will release said iodine stain from said staining agent into said areas in amounts corresponding to respective amount of said developing solution absorbed into said areas and said developing solution absorbed into said areas and said released stain will bond with the molecular structure of said copy medium to form an image according to said differential hardening of said copy medium with least hardened areas becoming most stained, allowing said developing solution to remain on said side of said film only until desired maximum densities of said stain are produced in said least hardened areas thereof and finally removing remaining amounts of said developing solution.

References Cited by the Examiner

UNITED STATES PATENTS

| | | | |
|---|---|---|---|
| 1,563,228 | 11/1925 | Rodriguez | 95—89 |
| 1,942,638 | 1/1934 | Draper | 96—40 |
| 2,130,071 | 9/1938 | Crowley et al. | 96—49 |
| 2,137,015 | 11/1938 | Crowley et al. | 96—49 |
| 2,168,183 | 8/1939 | Wilmanns et al. | 96—40 |
| 2,177,417 | 10/1939 | Eggert et al. | 96—40 |
| 2,328,219 | 8/1943 | Land | 88—65 |
| 2,413,630 | 12/1946 | Husek | 96—49 |
| 2,440,106 | 4/1948 | Land et al. | 96—40 |
| 2,445,581 | 7/1948 | Land | 88—65 |
| 2,481,830 | 9/1949 | Dreyer | 88—65 |
| 2,554,850 | 5/1951 | Binda | 88—65 |
| 2,612,079 | 9/1952 | Mahler | 88—65 |
| 2,674,159 | 4/1954 | Binda | 88—65 |
| 2,704,253 | 3/1955 | Janet | 96—93 |
| 2,854,335 | 9/1958 | Mahler | 96—40 |
| 2,854,908 | 10/1958 | Eloranta | 95—89 |
| 2,873,660 | 2/1959 | Land et al. | 95—89 |
| 2,892,383 | 6/1959 | Walworth et al. | 88—65 |
| 2,916,376 | 12/1959 | Ritter et al. | 96—93 |
| 2,921,852 | 1/1960 | Caton | 96—93 |
| 2,931,295 | 4/1960 | Ryan et al. | 88—65 |
| 2,957,766 | 10/1960 | Woodacre | 96—27 |
| 3,021,212 | 2/1962 | King | 96—66 |
| 3,035,912 | 5/1962 | Messena et al. | 96—27 |
| 3,035,913 | 5/1962 | Hellmig | 96—27 |

NORMAN G. TORCHIN, *Primary Examiner.*

LOUISE P. QUAST, *Examiner.*